US008397093B2

(12) United States Patent
Diab et al.

(10) Patent No.: US 8,397,093 B2
(45) Date of Patent: *Mar. 12, 2013

(54) PHYSICAL SEPARATION AND RECOGNITION MECHANISM FOR A SWITCH AND A POWER SUPPLY FOR POWER OVER ETHERNET (POE) IN ENTERPRISE ENVIRONMENTS

(75) Inventors: Wael William Diab, San Francisco, CA (US); Kenneth E. Venner, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,084

(22) Filed: Jan. 14, 2011

(65) Prior Publication Data

US 2011/0113276 A1 May 12, 2011

Related U.S. Application Data

(63) Continuation of application No. 11/785,712, filed on Apr. 19, 2007, now Pat. No. 7,873,844.

(60) Provisional application No. 60/816,879, filed on Jun. 28, 2006.

(51) Int. Cl.
*G06F 1/26* (2006.01)
(52) U.S. Cl. ........................... 713/340; 713/300
(58) Field of Classification Search .................. 713/300, 713/340
See application file for complete search history.

(56) References Cited

U.S. PATENT DOCUMENTS 5,889,381 A 3/1999 Wakefield
(Continued)

FOREIGN PATENT DOCUMENTS

WO WO 2005/036815 A1 4/2005

OTHER PUBLICATIONS

*802.3af TM, IEEE Standard for Information Techology—Telecommunications and information exchange between systems—Local and metropolitan area networs—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

*Primary Examiner* — Albert Wang
(74) *Attorney, Agent, or Firm* — Sterne, Kessler, Goldstein & Fox P.L.L.C.

(57) ABSTRACT

A Power-over-Ethernet (PoE) communication system dynamically provides power and data communications over a communications link. In an enterprise environment, a table top network switch uses a power supply to provide power for PoE and data communications to one or more powered devices (e.g., personal or laptop computers). To reduce the amount of heat generated in the table top network switch, the power supply is located external to the table network switch. The table top network switch may also include enterprise equipment, such as a video projector, a monitor for a personal computing device, another personal computing device to provide some examples. The power supply for the enterprise equipment may be included within the table top network switch to provide additional integration. The power for PoE and data communications to a limited number of powered devices (e.g., personal or laptop computers) may be included within the table top network switch to provide even further integration.

25 Claims, 11 Drawing Sheets

U.S. PATENT DOCUMENTS

| | | |
|---|---|---|
| 6,473,608 B1 | 10/2002 | Lehr et al. |
| 6,764,343 B2 | 7/2004 | Ferentz |
| 6,909,943 B2 | 6/2005 | Lehr et al. |
| 6,986,071 B2 | 1/2006 | Darshan et al. |
| 7,046,983 B2 | 5/2006 | Elkayam et al. |
| 7,117,272 B2 | 10/2006 | Rimboim et al. |
| 7,143,299 B1 | 11/2006 | Rubinstein et al. |
| 7,170,194 B2 * | 1/2007 | Korcharz et al. ............... 307/21 |
| 7,203,849 B2 | 4/2007 | Dove |
| 7,231,535 B2 | 6/2007 | Le Creff et al. |
| 7,320,078 B2 | 1/2008 | Balestriere |
| 7,337,336 B2 | 2/2008 | Ferentz et al. |
| 7,340,325 B2 | 3/2008 | Sousa et al. |
| 7,343,506 B1 | 3/2008 | Fenwick |
| 7,363,525 B2 | 4/2008 | Biederman et al. |
| 7,368,798 B2 | 5/2008 | Camagna et al. |
| 7,454,641 B2 | 11/2008 | Connor et al. |
| 7,549,067 B2 | 6/2009 | Tolliver |
| 7,873,844 B2 | 1/2011 | Diab et al. |
| 2005/0097378 A1 | 5/2005 | Hwang |
| 2005/0136989 A1 | 6/2005 | Dove |
| 2005/0276023 A1 | 12/2005 | Zansky et al. |
| 2006/0215680 A1 | 9/2006 | Camagna |
| 2006/0242458 A1 | 10/2006 | Feldman et al. |
| 2006/0244462 A1 | 11/2006 | McCosh et al. |
| 2006/0251179 A1 | 11/2006 | Ghoshal |
| 2007/0041577 A1 | 2/2007 | Ghoshal et al. |
| 2007/0074052 A1 | 3/2007 | Hemmah et al. |
| 2007/0079151 A1 | 4/2007 | Connor et al. |
| 2007/0106913 A1 | 5/2007 | Lewis et al. |
| 2007/0110360 A1 | 5/2007 | Stanford |
| 2007/0198748 A1 | 8/2007 | Ametsitsi et al. |
| 2007/0220280 A1 | 9/2007 | Karam et al. |
| 2007/0257780 A1 | 11/2007 | Schindler |
| 2008/0005433 A1 | 1/2008 | Diab et al. |
| 2008/0005600 A1 | 1/2008 | Diab et al. |
| 2008/0005601 A1 | 1/2008 | Diab |
| 2008/0005602 A1 | 1/2008 | Diab et al. |
| 2008/0016263 A1 | 1/2008 | Diab et al. |
| 2008/0052546 A1 | 2/2008 | Schindler |
| 2009/0228722 A1 | 9/2009 | Lin |
| 2009/0265563 A1 | 10/2009 | Camagna et al. |

* cited by examiner

PHYSICAL SEPARATION AND RECOGNITION MECHANISM FOR A SWITCH AND A POWER SUPPLY FOR POWER OVER ETHERNET (POE) IN ENTERPRISE ENVIRONMENTS

CROSS REFERENCE TO RELATED APPLICATIONS

This patent application is a continuation of U.S. patent application Ser. No. 11/785,712, filed Apr. 19, 2007, which claims the benefit of U.S. Provisional Patent Application No. 60/816,879, filed Jun. 28, 2006, each of which is incorporated herein by reference in its entirety.

BACKGROUND OF THE INVENTION

1. Field of the Invention

The present invention generally relates to powered devices (e.g., personal or laptop computers) in a Power over Ethernet (PoE) system, and more specifically to the separation of a switch and a power supply that are used in PoE systems in enterprise environments.

2. Related Art

Ethernet communications provide high speed data communications over a communications link between two communication nodes that operate according the IEEE 802 Ethernet Standard. The communications medium between the two nodes can be twisted pair wires for Ethernet, or other types of communications medium that are appropriate. Power over Ethernet (PoE) communication systems provide power and data communications over a common communications link. More specifically, a power source device (e.g., power source equipment (PSE)) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

The PSE device is often a data switch. Typically, a PSE on a switch is called an endspan device. The switch is typically a networking bridge device with data ports that can additionally have routing capability. The switch could have as little as two data ports or as many as 400 or more data ports. It may have two or more rows of data ports, where a data port in an input row of data ports can be switched to any one of the data ports in an output row of data ports. Each data port can include a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Typical PD devices that utilize PoE include Internet Protocol (IP) phones (Voice over IP (VoIP) phones), wireless access points, etc. Personal computing devices, such as personal or laptop computers, are another example of PD devices. The power requirements of personal computing devices are significantly different, and often much higher than that of VoIP phones and wireless access points.

The powering of personal computing devices using PoE in an enterprise environment places a tremendous noise and power density burden on a switch PSE. An enterprise environment often uses a table top network switch for the switch PSE. Placement of a power supply for PoE within the table top network switch may require the table top network switch to dissipate a tremendous amount of heat. For example, in an enterprise environment with ten personal computing devices, such as laptop computers, and a network switch having 10-ports may require approximately 25 watts (25 W) of PoE per port to go to each laptop. More power may be required if one or more of the laptops are executing higher power applications, or powering a USB device, for example, or if trickle or regular charging is required. In addition, the network switch needs approximately 2 W per port just for the data portion of the networking. Thus, assuming 100% efficiency, the total power required for PoE and data communications is approximately 270 W. Inefficiencies within the enterprise environment, such as AC/DC conversion efficiency in the power supply to provide an example, may require the power supply to generate in excess of 270 W. In addition, the table top network switch is vulnerable to noise, such as switching noise radiated by the power supply, noise from fans include within the table top network switch to provide some examples. Conventional techniques, such a low pass filtering or electromagnetic interference enclosures to provide some examples, are available to reduce the noise generated by the power supply, but they are costly and require additional space that is at a premium. In addition, some enterprise environments have stringent noise and heat requirements whereby conventional techniques will not alleviate the heat or the noise generated by the power supply.

What is needed is a configuration for a table top network switch to efficiently dissipate heat and to reduce noise in a table top network switch.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
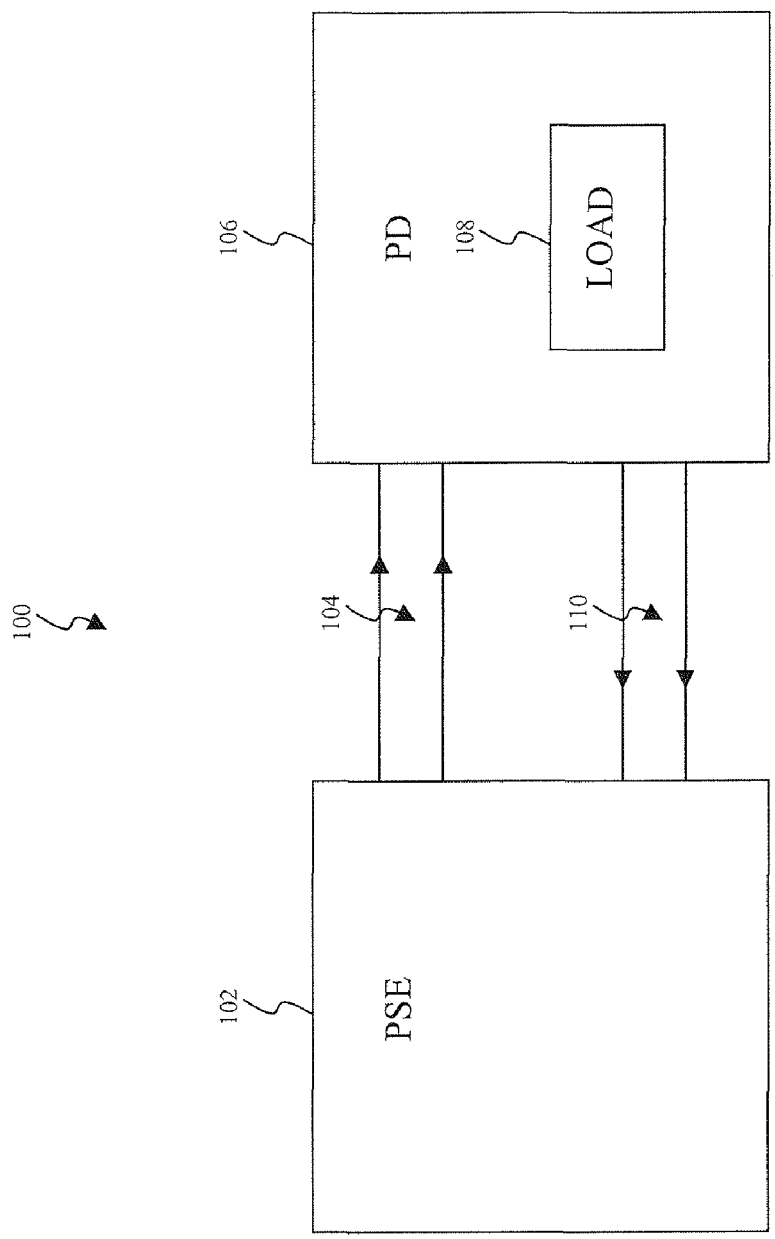
FIG. 1 is a block diagram of a conventional Power over Ethernet (PoE) system.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The power source equipment 102 provides PoE according to a known PoE standard, such as the IEEE 802.3af™ standard, the IEEE 802.3 at™ standard, a legacy PoE transmission, and/or any suitable type of PoE transmission standard to provide some examples. The PSE 102 and PD 106 also include data transceivers that operate according to a known communications standard, such as a 10 BASE-T, a 100 BASE-TX, a 1000 BASE-T, a 10 GBASE-T, and/or any other suitable communication standard to provide some examples. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
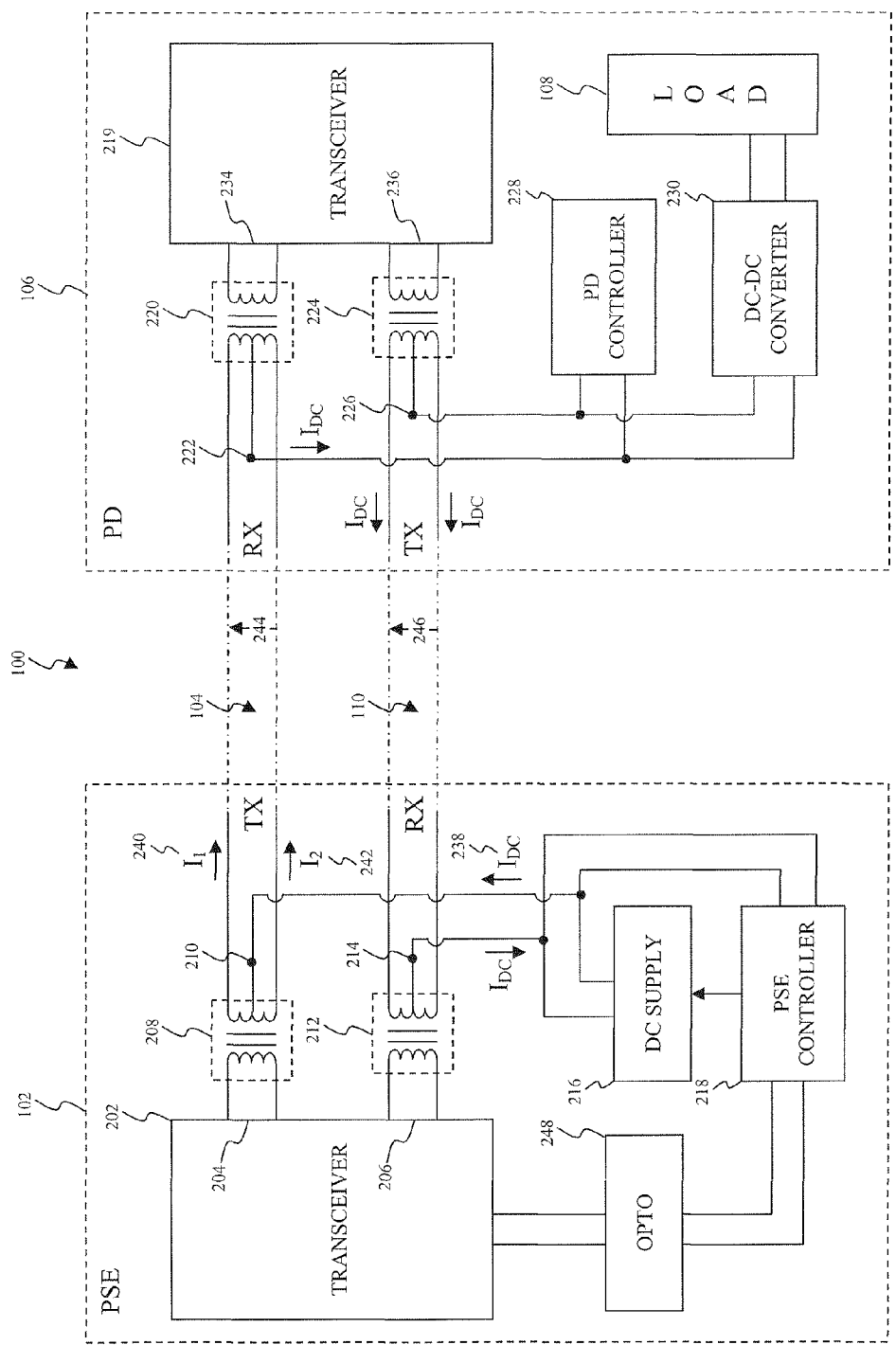
FIG. 2 illustrates a more detailed figure of the conventional power transfer from Power Source Equipment (PSE) to a Powered Device (PD) in a conventional Power over Ethernet (PoE) communications system.

FIG. 2 provides a more detailed circuit diagram of the Power over Ethernet (PoE) system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

Figure 3:
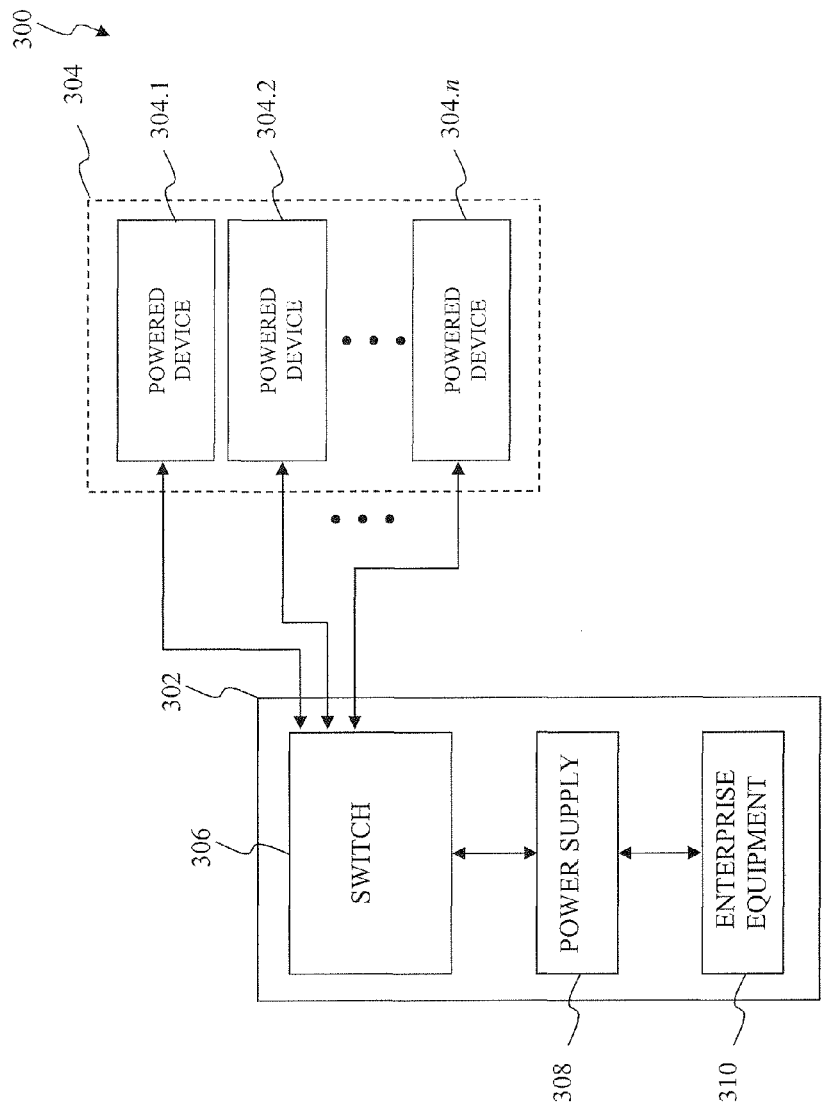
FIG. 3 illustrates a Power over Ethernet (PoE) configuration in a conventional enterprise environment.

FIG. 3 illustrates a Power over Ethernet (PoE) configuration in a conventional enterprise environment 300. The conventional enterprise environment 300 can be a conference room, for example, or any other environment in which one or more powered devices, such as personal computing devices are networked. However, the invention is not to be limited to personal computing devices as would be appreciated by those skilled in the relevant art. A personal computing device as described herein can include a personal computer, a laptop, a handheld computing device, or any other powered device that is capable of receiving power and data communications over a communications link.

The conventional enterprise environment 300 includes a table top network switch 302 connected to powered devices 304.1 through 304.$n$, hereinafter referred to as the powered devices 304. The powered devices 304 may include, but are not limited to Internet Protocol (IP) phones (Voice over IP (VoIP) phones), wireless access points, powered devices, such as personal or laptop computers. Those skilled in the art(s) will recognize that the powered devices 304 may include any suitable device that is capable of receiving power and data communications over a communications link without departing from the spirit and scope of the invention. The table top network switch 302 is capable of providing PoE and data communications over a communications link to the powered devices 304.

The table top network switch 302 includes a network switch 306, a power supply 308, and enterprise equipment 310. The network switch 306 may be any networking switch that is capable of providing PoE and data communications to the powered devices. The network switch 306 includes one or more data ports to provide PoE and data communications to the powered devices 304. The network switch 306 may have as little as two data ports or as many as 400 or more data ports.

As shown in FIG. 3, a power supply 308 provides power for the table top network switch 302 for PoE and the power for data communications to and from the powered devices 304. More specifically, the power supply 308, supplies power for the enterprise equipment 310, and for PoE and for data communications for the powered devices 304. The enterprise equipment 310 may include a video projector, such as a LCD (liquid crystal display) projector, a monitor for a personal computing device, another personal computing device, or any other suitable device capable of being used in an enterprise environment.

In the conventional enterprise environment 300, the network switch 306, the power supply 308, and the enterprise equipment 310 are encapsulated or packaged within the table top network switch 302. Placement of the power supply 308 within the table top network switch 302 may require the table top network switch 302 to dissipate a tremendous amount of heat. In an exemplary embodiment, a conventional enterprise environment 300 with ten powered devices 304, such as laptop computers, and a network switch 306 having 10-ports may require approximately 25 watts (25 W) of PoE per port to go to each laptop. More power may be required if one or more of the laptops are executing higher power applications, or powering a USB device, for example, or if trickle or regular charging is required. In addition, the network switch 306 needs approximately 2 W per port just for the data portion of the networking. Thus, assuming 100% efficiency, the total power required for PoE and data communications is approximately 270 W. Inefficiencies, such as AC/DC conversion efficiency in the power supply 308 to provide an example, within the conventional enterprise environment 300 may require the power supply 308 to generate in excess of 270 W. As a result of generating the requisite power for PoE and data communications for the conventional enterprise environment 300, the power supply 308 may produce a tremendous amount of heat. Other sources of heat, such as heat that results from transmission of the power for PoE and data communications from the power supply 308 to the network switch 306 to provide an example, may be present in the conventional enterprise environment 300. By completely encapsulating the power supply 308 within the table top network switch 302, the table top network switch 302 must dissipate the heat. Conventional methods to dissipate the heat in the table top network switch 302 may include using a fan or metal heat sink.

In addition, the conventional enterprise environment 300 is vulnerable to noise, such as switching noise radiated by the power supply 308 or noise from fans included within the table top network switch 302 to provide some examples. Conventional techniques, such a low pass filtering or electromagnetic interference enclosures to provide some examples, are available to reduce the noise generated by the power supply 308, but they are costly and require additional space that is at a premium in the table top network switch 302. In addition, some conventional enterprise environment 300 environments have stringent noise and heat requirements whereby conventional techniques will not alleviate the heat or the noise generated by the power supply.

Figure 4:
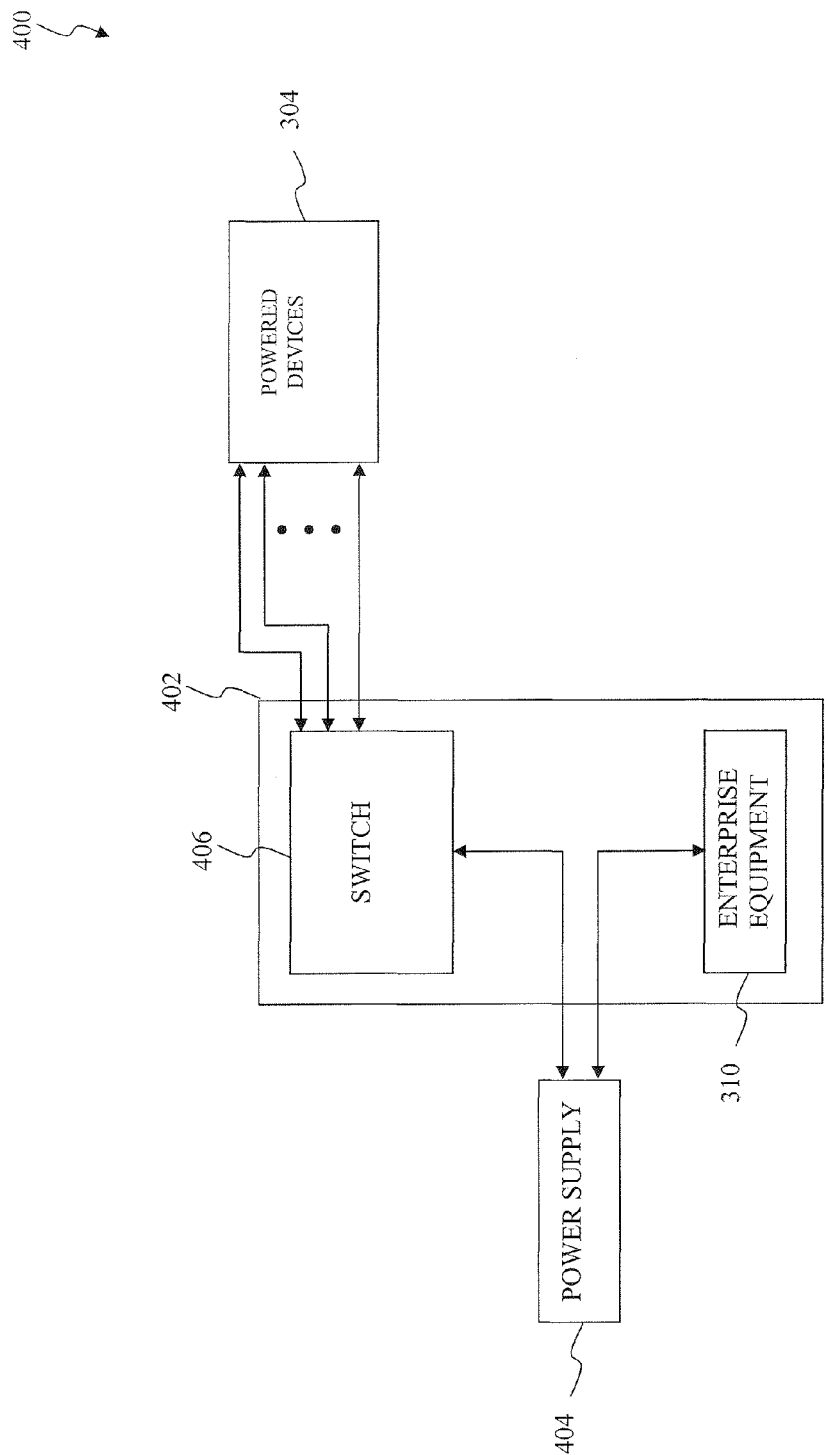
FIG. 4 illustrates a Power over Ethernet (PoE) configuration in an enterprise environment according to a first exemplary embodiment of the present invention.

FIG. 4 illustrates a Power over Ethernet (PoE) configuration in an enterprise environment 400 according to a first exemplary embodiment of the present invention. The enterprise environment 400 can be a conference room, for example, or any other environment in which one or more powered devices are networked.

The enterprise environment 400 includes a table top network switch 402 connected to a power supply 404 and to the powered devices 304. The table top network switch 402 is capable of providing PoE and data communications over a communications link to the powered devices 304. The network switch 406 may be any networking switch that is capable of providing PoE and data communications to the powered devices 304. The network switch 406 includes one or more data ports to provide PoE and data communications to the powered devices 304. The network switch 406 may have as little as two data ports or as many as 400 or more data ports.

As shown in FIG. 4, a power supply provides the power for the table top network switch 402 for PoE and the power for data communications for the powered devices 304. More specifically, a power supply, denoted as power supply 404, supplies power for the enterprise equipment 310, and for PoE for the powered devices 304. The table top network switch 402 includes the network switch 406 and enterprise equipment 310. In the enterprise environment 400, the network switch 406 and the enterprise equipment 310 are encapsulated or packaged within the table top network switch 402 while the power supply 404 is located outside of or external to the table top network switch 402.

Figure 5:
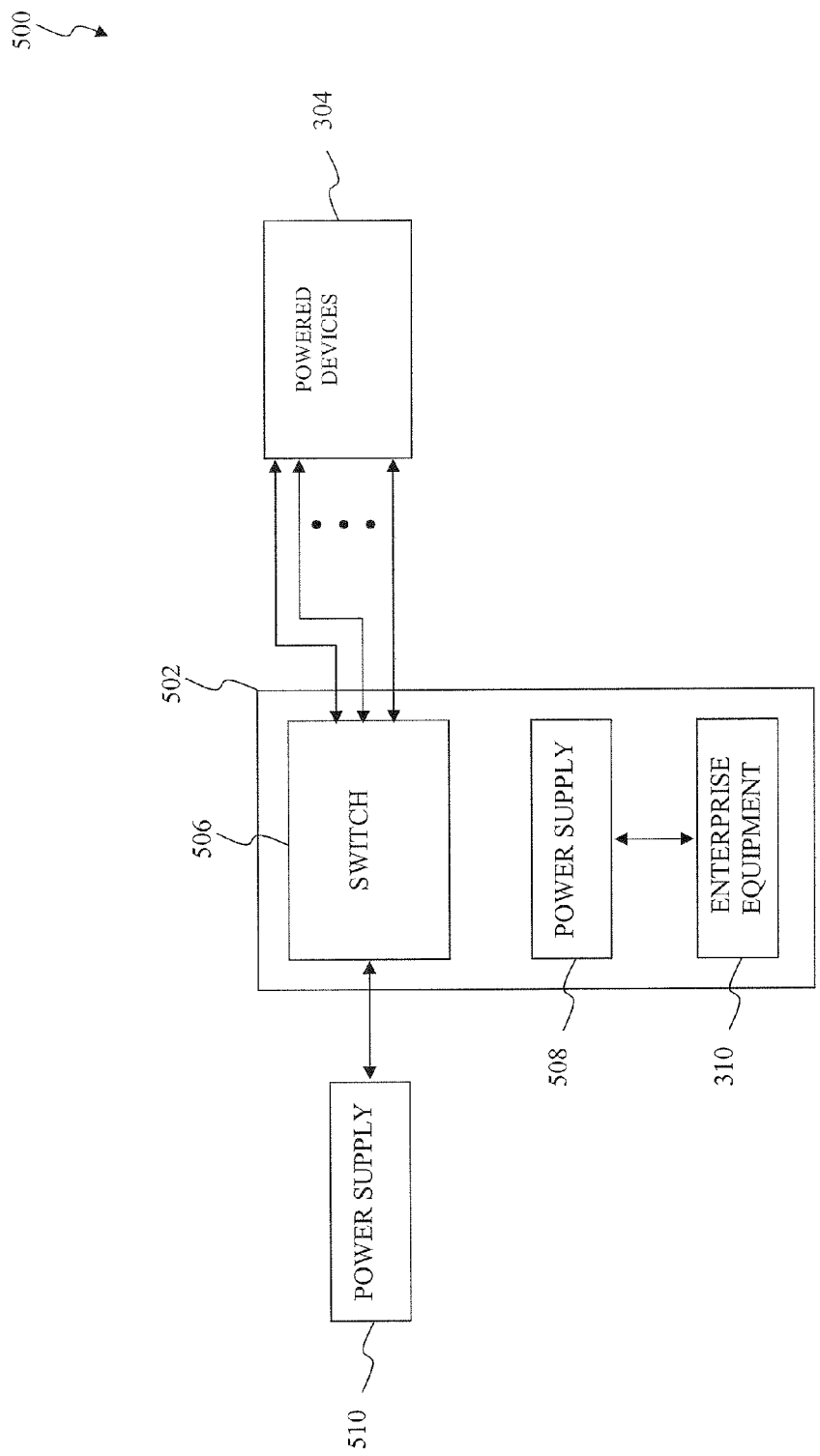
FIG. 5 illustrates a Power over Ethernet (PoE) configuration in an enterprise environment according to a second exemplary embodiment of the present invention.

FIG. 5 illustrates a Power over Ethernet (PoE) configuration in an enterprise environment 500 according to a second exemplary embodiment of the present invention. The enterprise environment 500 can be a conference room, for example, or any other environment in which one or more powered devices are networked.

The enterprise environment 500 includes a table top network switch 502 connected a power supply 510 and to the powered devices 304. The table top network switch 502 is capable of providing PoE and data communications over a communications link to the powered devices 304. The network switch 506 may be any networking switch that is capable of providing PoE and data communications to the powered devices 304. The network switch 506 includes one or more data ports to provide PoE and data communications to the powered devices 304. The network switch 506 may have as little as two data ports or as many as 400 or more data ports.

As shown in FIG. 5, separate power supplies provide power for the table top network switch 502 for PoE and the power for data communications for the powered devices 304. More specifically, a first power supply, denoted as power supply 508, supplies power for the enterprise equipment 310. Likewise, a second power supply, denoted as power supply 510, provides PoE for the powered devices 304. The power for the data communications provided by the network switch 506 is provided by the power supply 508.

The table top network switch 502 includes the network switch 506, the power supply 508, and enterprise equipment 310. In the enterprise environment 500, the network switch 506, the power supply 508, and the enterprise equipment 310 are encapsulated or packaged within the table top network switch 502 while the power supply 510 is located outside of or external to the table top network switch 502.

Figure 6:
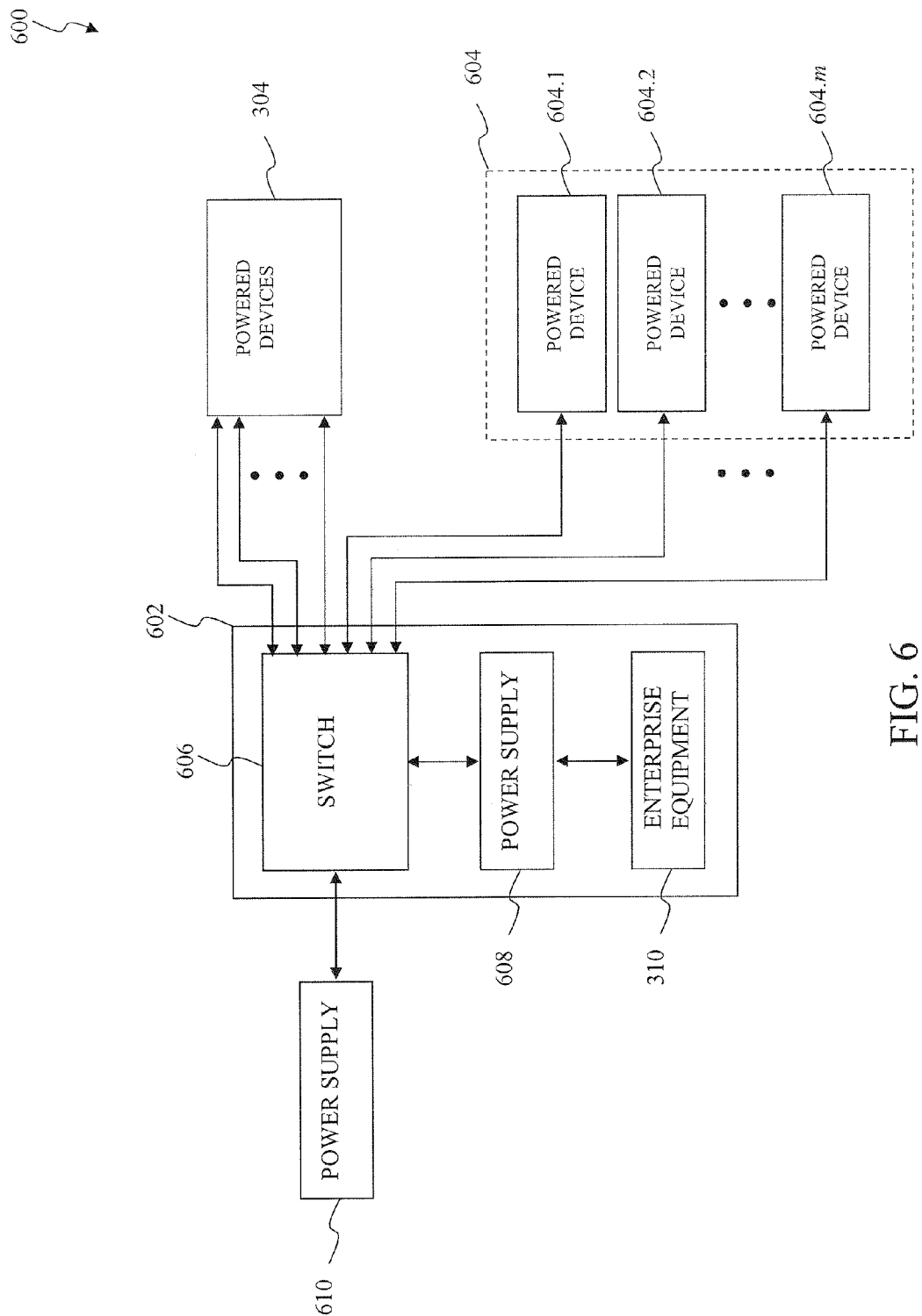
FIG. 6 illustrates a Power over Ethernet (PoE) configuration in an enterprise environment according to a third exemplary embodiment of the present invention.

FIG. 6 illustrates a Power over Ethernet (PoE) configuration in an enterprise environment 600 according to a third exemplary embodiment of the present invention. The enterprise environment 600 can be a conference room, for example, or any other environment in which one or more powered devices are networked.

The enterprise environment 600 includes a table top network switch 602 connected to a power supply 610. The table top network switch 602 also connects to the powered devices 304 and to powered devices 604.1 through 604.m, hereinafter referred to as the powered devices 604. The table top network switch 602 is capable of providing PoE and data communications over a communications link to the powered devices 304 and to the powered devices 604. The network switch 606 may be any networking switch that is capable of providing PoE and data communications to the powered devices. The network switch 606 includes one or more data ports to provide PoE and data communications to the powered devices 304 and to the powered devices 604. The network switch 606 may have as little as two data ports or as many as 400 or more data ports.

As shown in FIG. 6, separate power supplies provide the power for the table top network switch 602 for PoE and the power for data communications for the powered devices 304 and the powered devices 604. In an exemplary embodiment, the powered devices 604 are substantially similar to the powered devices 304. More specifically, a first power supply, denoted as power supply 608, supplies power for the enterprise equipment 310 and for the powered devices 604. Likewise, a second power supply, denoted as power supply 610, provides PoE for the powered devices 304. The power for the data communications provided by the network switch 606 may either be provided entirely by the power supply 608 or the power can be split among the power supply 608 and the power supply 610.

The table top network switch 602 includes the network switch 606, the power supply 608, and enterprise equipment 310. In the enterprise environment 600, the network switch 606, the power supply 608, and the enterprise equipment 310 are encapsulated or packaged within the table top network switch 602, whereas the power supply 610 is located outside of or external to the table top network switch 602.

Figure 7:
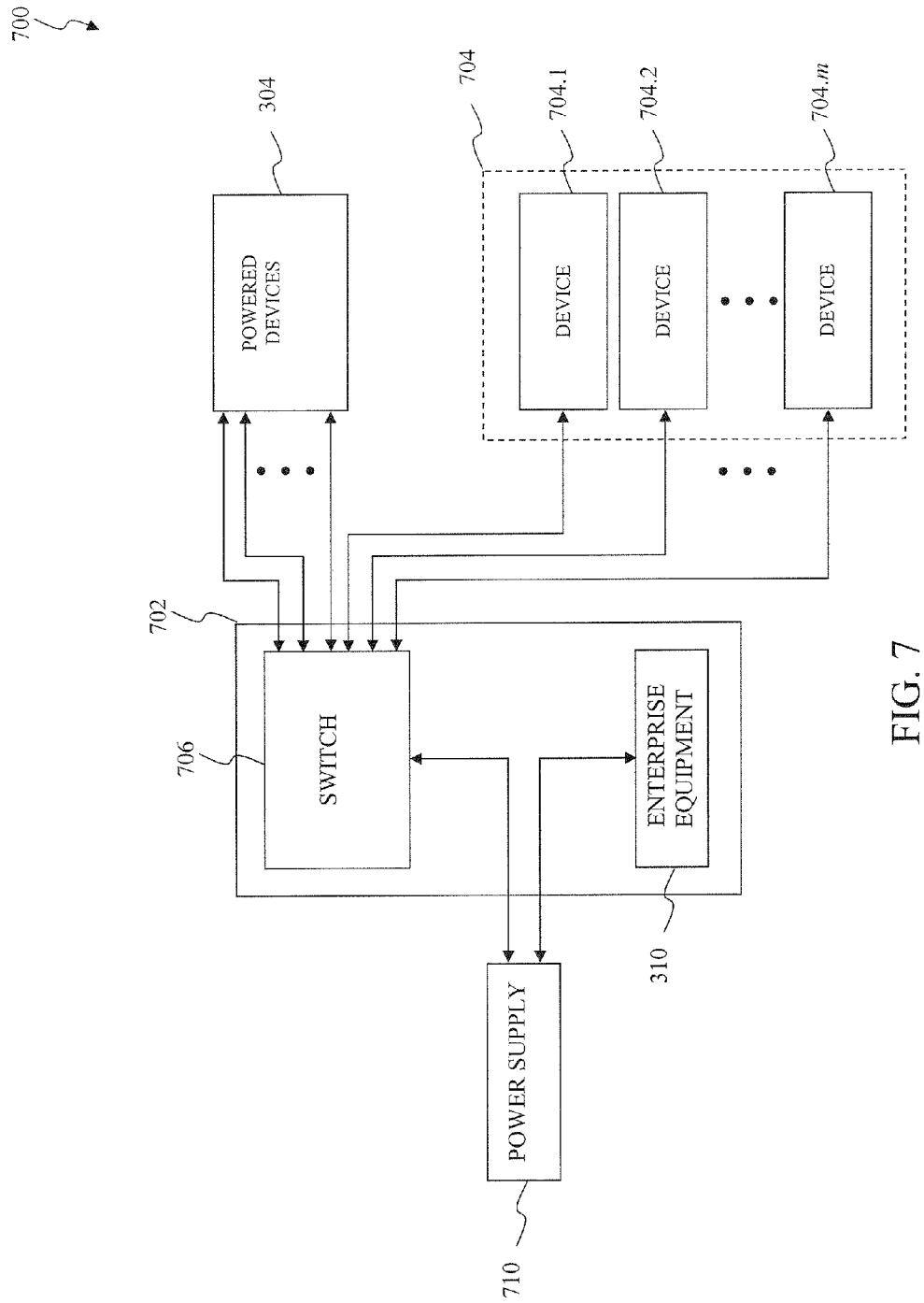
FIG. 7 illustrates a Power over Ethernet (PoE) configuration having non-PoE devices in an enterprise environment according to an exemplary embodiment of the present invention.

FIG. 7 illustrates a Power over Ethernet (PoE) configuration having non-PoE devices in an enterprise environment 700 according to an exemplary embodiment of the present invention. The enterprise environment 700 can be a conference room, for example, or any other environment in which one or more powered devices are networked.

The enterprise environment 700 includes a table top network switch 702 connected to a power supply 710. The table top network switch 702 also connects to the powered devices 304 and to non-PoE powered devices 704.1 through 704.m, hereinafter referred to as the non-PoE powered devices 704. The non-PoE powered devices 704 include any suitable device, such as a desktop computer, that receives power from a source other than the communications link but is capable of data communications over a communications link. The table top network switch 702 is capable of providing PoE and data communications over a communications link to the powered devices 304 and data communications over the communications link to the non-PoE powered devices 704. The network switch 706 may be any networking switch that is capable of providing PoE and data communications to the powered devices. The network switch 706 includes one or more data ports to provide PoE and data communications for the powered devices 304 and data communications for the non-PoE powered devices 704. The network switch 706 may have as little as two data ports or as many as 400 or more data ports.

As shown in FIG. 7, a power supply provides the power for the table top network switch 702 for PoE and the power for data communications for the powered devices 304 and the power for data communications for the non-PoE powered devices 704. More specifically, a power supply, denoted as power supply 710, supplies power for the enterprise equipment 310, and for PoE and data communications for the powered devices 304 and for data communications for the non-PoE powered devices 704. The table top network switch 702 includes the network switch 706 and enterprise equipment 310. In the enterprise environment 700, the network switch 706 and the enterprise equipment 310 are encapsulated or packaged within the table top network switch 702 while the power supply 710 is located outside of or external to the table top network switch 402.

Figure 8:
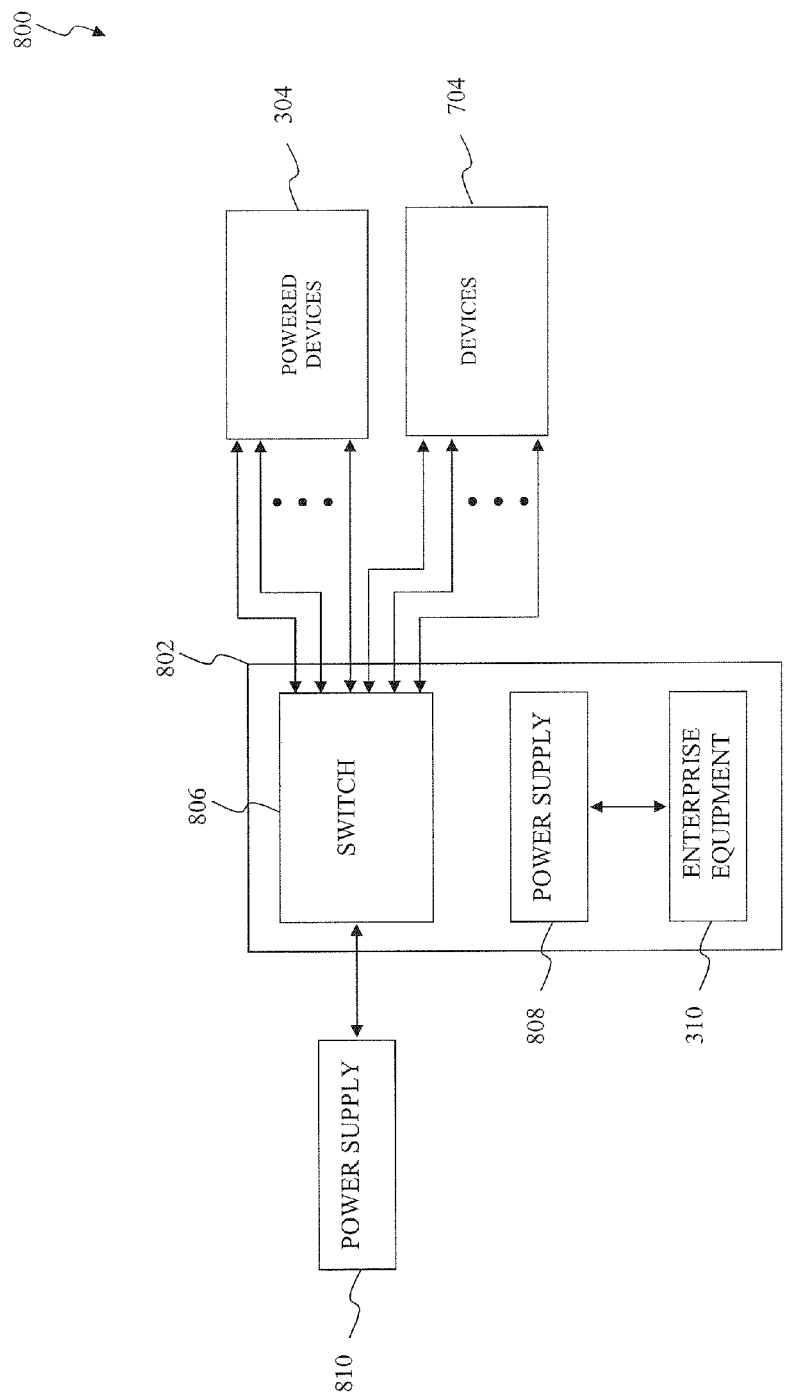
FIG. 8 illustrates a Power over Ethernet (PoE) configuration having non-PoE devices in an enterprise environment according to a second exemplary embodiment of the present invention.

FIG. 8 illustrates a Power over Ethernet (PoE) configuration having non-PoE devices in an enterprise environment 800 according to a second exemplary embodiment of the present invention. The enterprise environment 800 can be a conference room, for example, or any other environment in which one or more powered devices are networked.

The enterprise environment 800 includes a table top network switch 802 connected to a power supply 810, to the powered devices 304, and to the non-PoE powered devices 704. The table top network switch 802 is capable of providing PoE and data communications over a communications link to the powered devices 304 and data communications over the communications link to the non-PoE powered devices 704. The network switch 806 may be any networking switch that is capable of providing PoE and data communications to the powered devices 304 and data communications to the non-PoE powered devices 704. The network switch 806 includes one or more data ports to provide PoE and data communications to the powered devices 304 and data communications to the non-PoE powered devices 704. The network switch 806 may have as little as two data ports or as many as 400 or more data ports.

As shown in FIG. 8, separate power supplies provide the power for the table top network switch 802 for PoE and the power for data communications for the powered devices 304 and the power for data communications to the non-PoE powered devices 704. More specifically, a first power supply, denoted as power supply 808, supplies power for the enterprise equipment 310. Likewise, a second power supply, denoted as power supply 810, provides power for PoE and data communications for the powered devices 304 and power for data communications to the non-PoE powered devices 704.

The table top network switch 802 includes the network switch 806, the power supply 808, and enterprise equipment 310. In the enterprise environment 800, the network switch 806, the power supply 808, and the enterprise equipment 310 are encapsulated or packaged within the table top network switch 802 while the power supply 810 is located outside of or external to the table top network switch 802.

Figure 9:
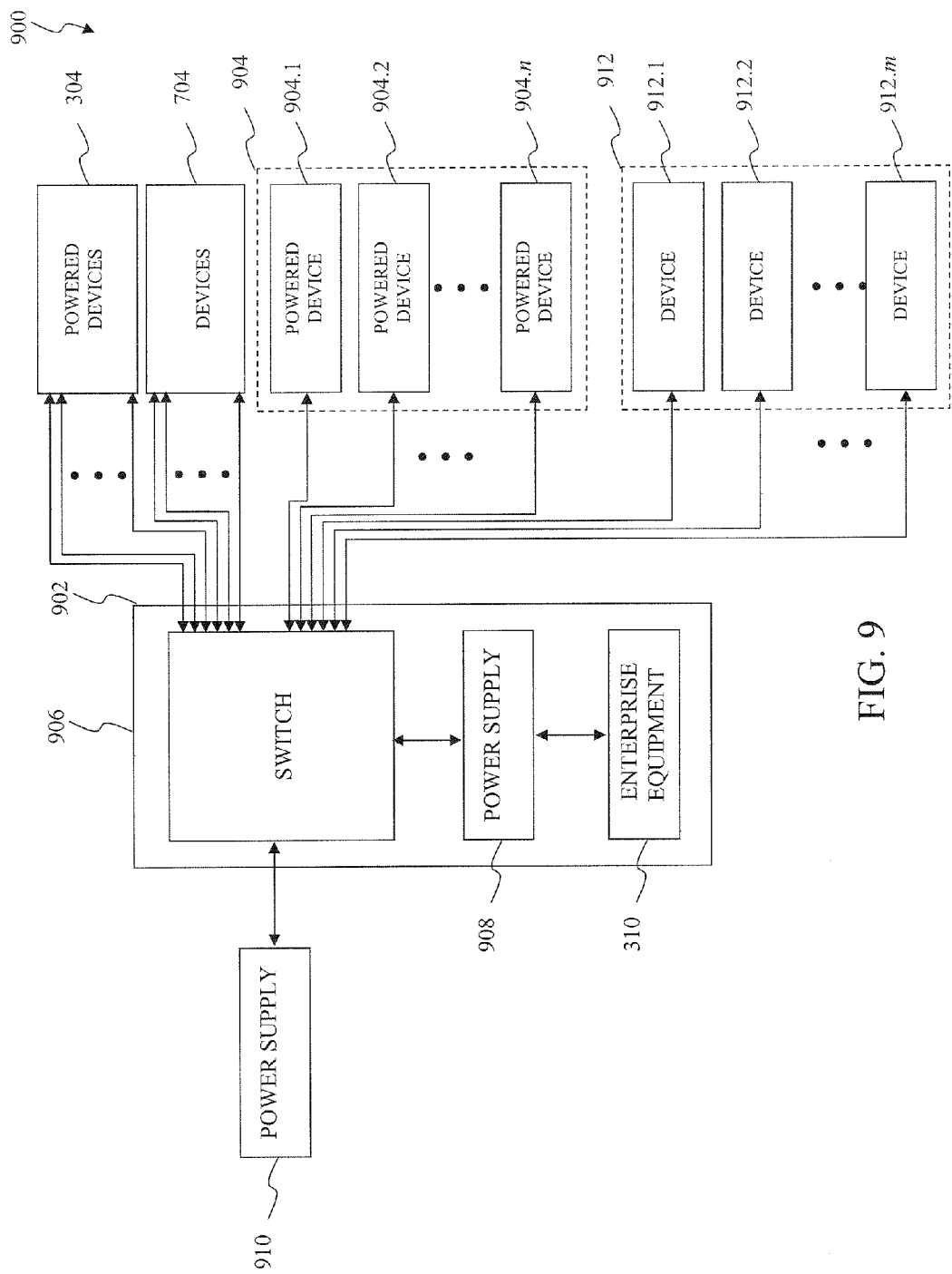
FIG. 9 illustrates a Power over Ethernet (PoE) configuration having non-PoE devices in an enterprise environment according to a third exemplary embodiment of the present invention.

FIG. 9 illustrates a Power over Ethernet (PoE) configuration having non-PoE devices in an enterprise environment 900 according to a third exemplary embodiment of the present invention. The enterprise environment 900 can be a conference room, for example, or any other environment in which one or more powered devices are networked.

The enterprise environment 900 includes a table top network switch 902 connected to a power supply 910. The table top network switch 902 also connects to the powered devices 304, to the powered devices 904, to the powered devices 904.1 through 904.n, hereinafter referred to as the powered devices 904, and to the non-PoE powered devices 912.1 through 912.m, hereinafter referred to as the non-PoE powered devices 912. The table top network switch 902 is capable of providing PoE and data communications over a communications link to the powered devices 304 and to the powered devices 904 and data communications over the communications link to the non-PoE powered devices 704 and to the non-PoE powered devices 912. The network switch 906 may be any networking switch that is capable of providing PoE and data communications to the powered devices and data communications to the devices. The network switch 906 includes one or more data ports to provide PoE and data communications to the powered devices 304 and the powered devices 904 and data communications to the non-PoE powered devices 704 and the non-PoE powered devices 912. The network switch 906 may have as little as two data ports or as many as 400 or more data ports.

As shown in FIG. 9, separate power supplies provide the power for the table top network switch 902 for PoE and the power for data communications for the powered devices 304 and the powered devices 904 and the power for data communications to the non-PoE powered devices 704 and the non-PoE powered devices 912. In an exemplary embodiment, the powered devices 904 are substantially similar to the powered devices 304. In another exemplary embodiment, the non-PoE powered devices 912 are substantially similar to the non-PoE powered devices 704. More specifically, a first power supply, denoted as power supply 908, supplies power for the enterprise equipment 310, for PoE and data communications for the powered devices 904 and for data communications for the non-PoE powered devices 912. Likewise, a second power supply, denoted as power supply 910, provides PoE and data communications for the powered devices 304 and for data communications for the non-PoE powered devices 704. Those skilled in the art will recognize that the power for data communications may provided by the power supply 908, the power supply 910 or can be allocated between the power supply 908 and the power supply 910 without departing from the spirit and scope of the invention.

The table top network switch 902 includes the network switch 906, the power supply 908, and enterprise equipment 310. In the enterprise environment 900, the network switch 906, the power supply 908, and the enterprise equipment 310 are encapsulated or packaged within the table top network switch 902, whereas the power supply 910 is located outside of or external to the table top network switch 902.

As shown in FIG. 4 through FIG. 9, the enterprise environment includes at least one power supply external to a corresponding table top network switch. Placement of the power supply, such as the power supply 404, the power supply 510, the power supply 610, the power supply 710, the power supply 810, or the power supply 910, external to a corresponding table top network switch, such as the table top network switch 402, the table top network switch 502, the table top network switch 602, the table top network switch 702, the table top network switch 802, or the table top network switch 902 relieves the corresponding table top network switch some of the burden of dissipating heat generated by the power supply within the enterprise environment. Instead, the heat is dissipated into the ambient environment without traveling through the table top network switch. Further, placing the power supply external to the corresponding table top network switch reduces noise, such as noise radiated from the power supply or from the noise of fans included within the table top network switch to provide some examples.

Placing the power supply external to the table top network switch allows for greater flexibility when compared to the conventional enterprise environment. For example, extending the number of powered devices in the enterprise environment such as the enterprise environment 400, the enterprise environment 500, enterprise environment 600, enterprise environment 700, enterprise environment 800, or enterprise environment 900, requires only increasing the power output of the external power supply, such as the power supply 404, the power supply 510, the power supply 610, the power supply 710, the power supply 810, or the power supply 910 assuming sufficient data ports are available on the corresponding network switch. Whereas extending the number of powered devices in the conventional enterprise environment requires a completely different table top network switch, even if sufficient data ports are available on the network switch. Similarly, if the power demand for PoE and data communication increases in the enterprise environment, for example switching from laptop computers to personal computers, only the external power supply need be augmented, whereas the conventional enterprise environment requires a completely different table top network switch to change from laptop computers to personal computers. In addition, in some enterprise environments including a large number of power devices, such as the powered devices 304, and/or non-PoE powered devices, such as the non-PoE powered devices 704, the power supply required for PoE may become prohibitively large to place encapsulate within the table top network switch. In these scenarios, the table top network switch may become prohibitively large for the enterprise environment when the power supply is completely encapsulated within the table top network switch. By placing the power supply external to the table top network switch, a comparative smaller table top network switch may be used in the enterprise environments that contain a large number of devices.

Similarly, placing the power supply external to the table top network switch allows the production of more cost effective table top network switches. An individual table top network switch, such as the table top network switch 402, may be produced to operate in multiple enterprise environments. For example, an end-user may utilize the same table top network switch for several individual enterprise environments. In this situation, the end-user only needs to customize the external power supply for each individual enterprise environment, which may equate to a cost savings compared to purchasing separate conventional table top network switches for each individual enterprise environment.

Incorporating a second power supply, such as the power supply 508, the power supply 608, the power supply 808, or the power supply 908 into the table top network switch environment, allows for greater integration than using a single power supply alone. For example, as shown in FIG. 5, the power supply 508 is integrated into the table top network switch 502 to provide power to a piece of enterprise equipment, such as enterprise equipment 310. The power supply for the enterprise equipment and the enterprise equipment itself is seamless; the end-user does not have to supply additional power to operate the enterprise equipment. Additional integration may be obtained by allowing the second power supply to provide power for PoE and data communications to a limited number of powered devices. For example, the power supply 608 supplies power to the powered devices 604 as well as to the enterprise equipment 310. The powered devices 604 may include one to four powered devices. The power for any remaining powered devices, such as powered devices 304, is provided by power supply 610.

Figure 10:
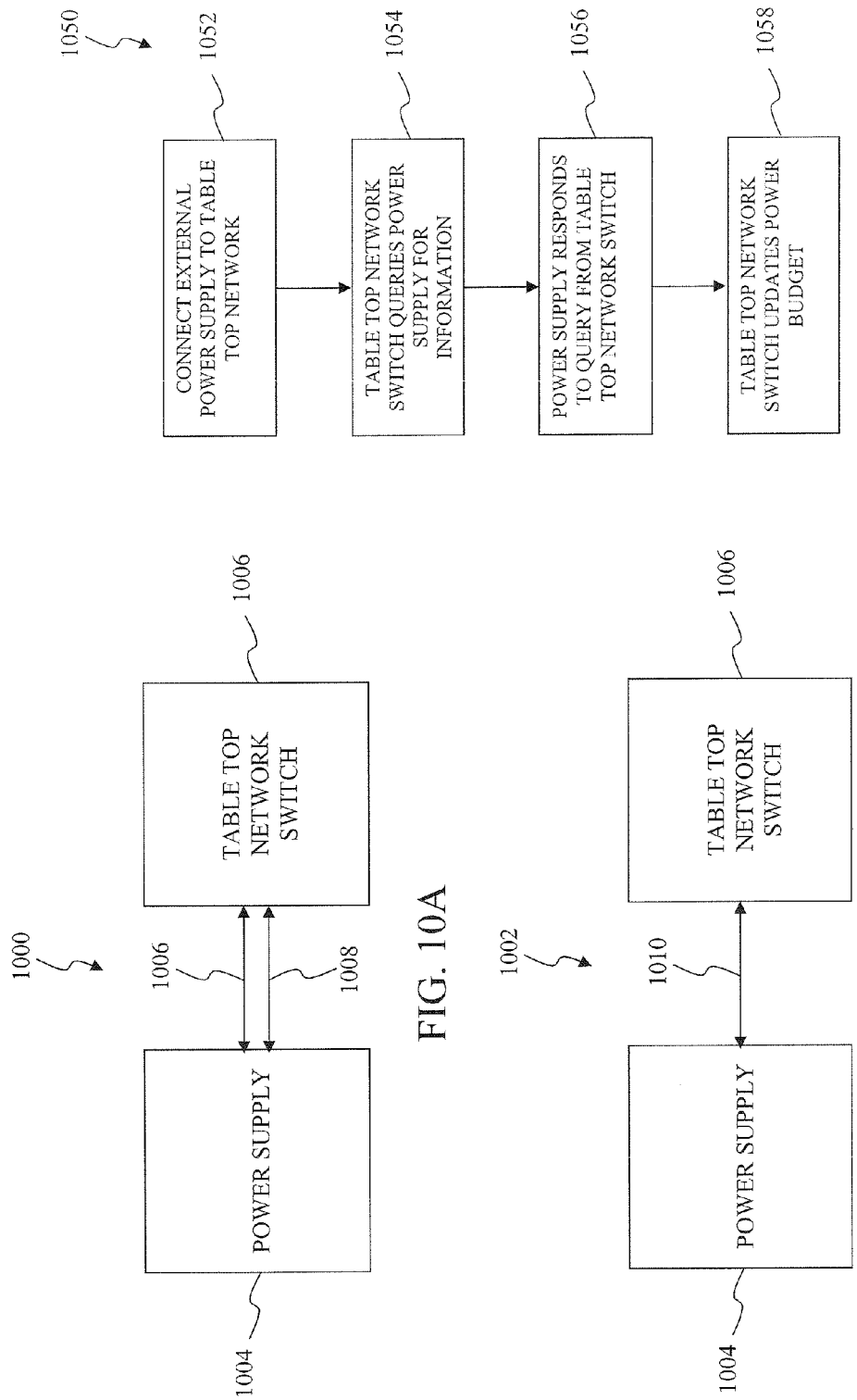
FIG. 10A illustrates the connection between an external power supply and a table top network switch according to an exemplary embodiment of the present invention.
FIG. 10B illustrates a connection between an external power supply and a table top network switch according to another exemplary embodiment of the present invention.
FIG. 10C is a flowchart of exemplary operational steps of an auto-detection function according to an exemplary embodiment of the present invention.

FIG. 10A illustrates a connection 1000 between an external power supply and a table top network switch according to an exemplary embodiment of the present invention. As shown in FIG. 10A, an external power supply 1004 is connected to a table top network switch 1006 via a power conductor 1006 and a data interface 1008. The external power supply 1004 may include the power supply 404, the power supply 510, the power supply 610, the power supply 710, the power supply 810, or the power supply 910. The table top network switch 1006 may include the table top network switch 402, the table top network switch 502, the table top network switch 602, the table top network switch 702, the table top network switch 802, or the table top network switch 902. In this exemplary embodiment, the power conductor 1006 provides the power for PoE and/or data communications to the table top network switch 1006 from the power supply 1004, whereas the data interface 1008 provides means of communication between the power supply 1004 and the table top network switch 1006. For example, the external power supply 1004 may output a serial data stream using a bit stream or packet based scheme onto data interface 1008. The data interface 1008 may be implemented as a UART interface, an I2C interface, a MDIO interface, or any other suitable interface. Example communications between the external power supply 1004 and the table top network switch 1006 may include, but is not limited to, power supply parameters, including voltage and current requirements of the powered devices. As such, the table top network switch 1006 can manage the power supplied to the powered devices, such as power devices 304, and the non-powered devices, such as the non-PoE powered devices 704. The external power supply 1004 may also communicate device specific parameters such as maximum output power, device identity, or any other suitable information to the table top network switch 1006.

FIG. 10B illustrates a connection 1002 between an external power supply and a table top network switch according to an exemplary embodiment of the present invention. As shown in FIG. 10B, an external power supply 1004 is connected to a table top network switch 1006 via a power conductor 1006. In this exemplary embodiment, the power conductor 1006 provides both the power for PoE and/or data communications and the data interface to the table top network switch 1006 from the power supply 1004.

FIG. 10C is a flowchart of exemplary operational steps of an auto-detection function according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 10C.

At step 1052, an external power supply such as the power supply 404, the power supply 510, the power supply 610, the power supply 710, the power supply 810, or the power supply 910 is connected to a table top network switch such as the table top network switch 402, the table top network switch 502, the table top network switch 602, the table top network switch 702, the table top network switch 802, or the table top network switch 902.

At step 1054, the table top network switch queries the external power supply for information. The table top network switch may queries the external power supply for device specific parameters such as maximum output power, device identity, or any other suitable information. The table top network may communicate with the external power supply using a dedicated data interface as shown in FIG. 10A or a combined data and power interface as shown in FIG. 10B.

At step 1056, the external power supply responds to the query from the table top network switch. The external power supply may communicate with the table top network switch using a dedicated data interface as shown in FIG. 10A or a combined data and power interface as shown in FIG. 10B.

At step 1058, the table top network switch updates its total power budget available to provide PoE to the powered devices, such as powered devices 304, based upon the information from the external power supply.

Figure 11:
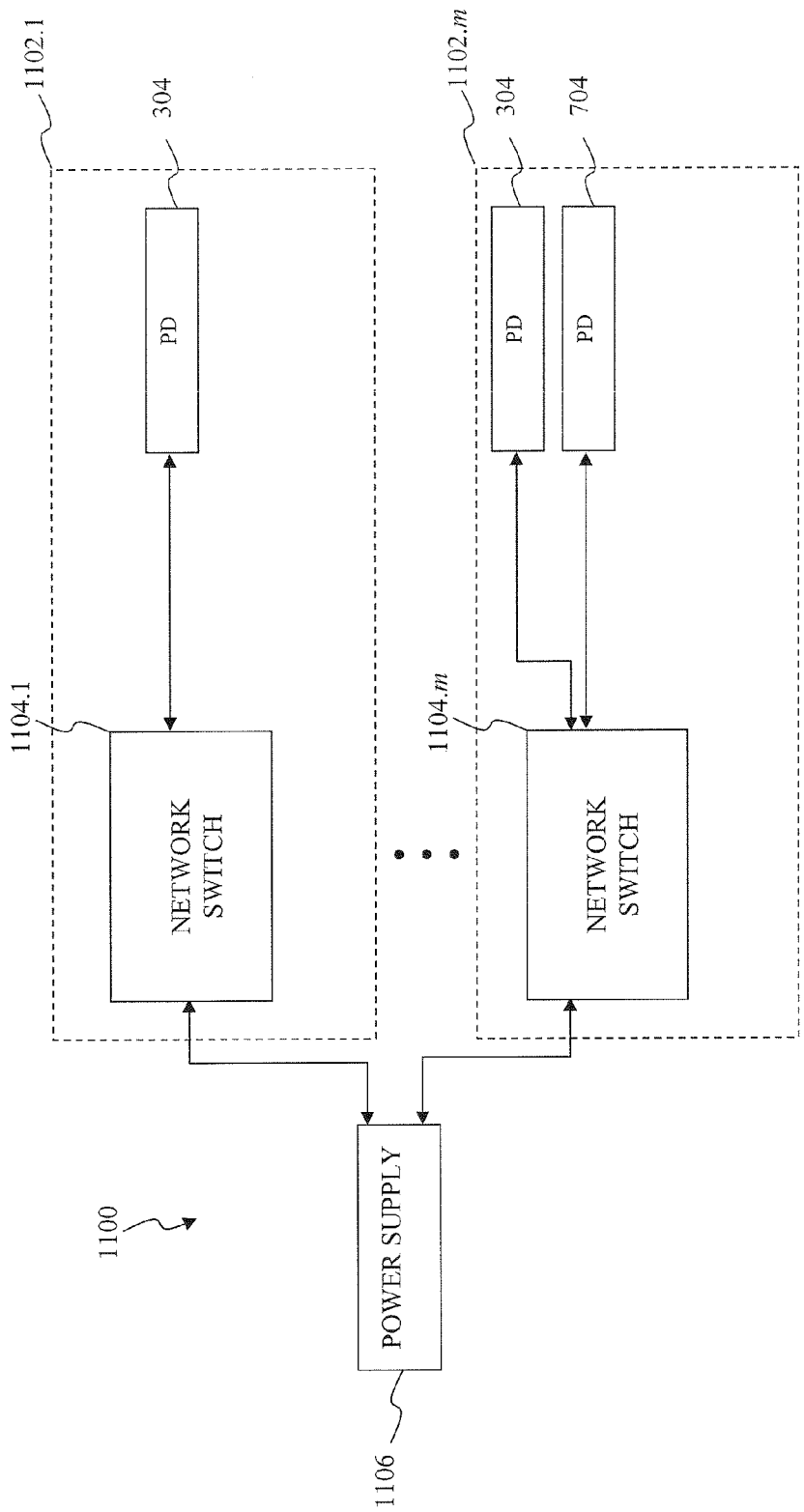
FIG. 11 illustrates a Power over Ethernet (PoE) configuration in a multiple enterprise environment according to an exemplary embodiment of the present invention.

FIG. 11 illustrates a Power over Ethernet (PoE) configuration in a multiple enterprise environment 1100 according to an exemplary embodiment of the present invention. The multiple enterprise environment 1100 includes enterprise environments 1102.1 through 1102.m. The enterprise environments 1102.1 through 1102.m can be conference rooms, for example, or any other environment in which one or more powered devices are networked. A corresponding enterprise environment 1102.1 through 1102.m includes a corresponding network switch 1104.1 through 1104.m to provide PoE and/or data communication to the powered devices and/or devices. For example, enterprise environment 1104.1 includes the network switch 1104.1 to provide PoE and data communication to the powered devices 304 as shown in FIG. 4 and FIG. 5. The network switch 1104.1 may have as little as two data ports or as many as 400 or more data ports. Similarly, enterprise environment 1104.m includes the network switch 1104.m to provide PoE and data communication to the powered devices 304 and to the non-PoE powered devices 704 as shown in FIG. 7 and FIG. 8. The network switch 1104.m may have as little as two data ports or as many as 400 or more data ports. Each enterprise environment 1104.1 through 1104.m need not contain an identical number of powered devices. Those skilled in the art(s) will recognize that the enterprise environments 1104.1 through 1104.m powered devices 304 may include any enterprise environment as discussed in FIG. 4 through FIG. 9 without departing from the spirit and scope of the invention As shown in FIG. 11, the multiple enterprise environment 1100 includes enterprise environments 1102.1 through 1102.m connected to a power supply 1106. The power supply 1106 may completely provide a corresponding enterprise environment 1102.1 through 1102.m with the power required for PoE and data communications as shown in FIG. 4 or the corresponding enterprise environment 1102.1 through 1102.m may share the power demand with the power supply 1106 as shown in FIG. 5 and FIG. 6 using their own internal power supply, such as power supply 508 or power supply 608. The power supply 1106 may be located external to enterprise environments 1102.1 through 1102.m, included within a single enterprise environment within the multiple enterprise environment 1100, or included within multiple enterprise environments within multiple enterprise environment 1100.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A table top network switch for a Power-over-Ethernet (PoE) system, comprising:
 a first power supply configured to provide a first direct current (DC) power; and
 a network switch coupled to the first power supply, wherein the network switch is configured to:
  receive information from a second power supply in response to detecting a connection between the second power supply and the network switch, the second power supply being configured to provide a second DC power, and
  provide the first DC power and the second DC power, respectively, to a first group of powered devices and a second group of powered devices from among a plurality of powered devices.

2. The table top network switch of claim 1, wherein the first power supply is encapsulated within the table top network switch.

3. The table top network switch of claim 1, wherein the second power supply is located externally to the table top network switch.

4. The table top network switch of claim 1, wherein the information comprises at least one of a group consisting of:
 voltage requirements for the plurality of powered devices;
 current requirements for the plurality of powered devices;
 a maximum output power of the second power supply; and
 an identity of the second power supply.

5. The table top network switch of claim 1, wherein the network switch is configured to query the second power supply for the information upon its coupling to the network switch.

6. The table top network switch of claim 5, wherein the second power supply is configured to provide the information in response to the query.

7. The table top network switch of claim 6, wherein the first power supply and the enterprise equipment are encapsulated within the table top network switch.

8. The table top network switch of claim 1, wherein the network switch is coupled to the second power supply via a power conductor, the network switch being configured to query the second power supply over the power conductor.

9. The table top network switch of claim 1, wherein the network switch is configured to provide a first data communication and a second data communication to the first group of powered devices and the second group of powered devices, respectively.

10. The table top network switch of claim 1, wherein the first power supply is fin ,iler configured to provide the first DC power to enterprise equipment.

11. An enterprise network environment for a Power-over-Ethernet (PoE) system, comprising:
 a table top network switch configured to:
  produce a first direct current (DC) power,
  receive a second DC power,
  receive, in response to detecting the second DC power, information regarding the second DC power, and
  provide the first DC power and the second DC power, respectively, to a first group of powered devices and a second group of powered devices from among a plurality of powered devices.

12. The enterprise network environment of claim 11, wherein the table top network switch comprises:
 a first power supply configured to provide the first DC power; and
 a network switch, coupled to the first power supply, configured to provide the first DC power and the second DC power to the first group of powered devices and the second group of powered devices, respectively.

13. The enterprise network environment of claim 12, wherein the first power supply and the network switch are encapsulated within the table top network switch.

14. The enterprise network environment of claim 12, further comprising:
 enterprise equipment, coupled to the network switch, the network switch being further configured to provide the first DC power to the enterprise equipment.

15. The table top network switch of claim 14, wherein the first power supply, the network switch, and the enterprise equipment are encapsulated within the table top network switch.

16. The enterprise network environment of claim 11, wherein the table top network switch is coupled to a second power supply, the second power supply being configured to provide the second DC power.

17. The table top network switch of claim 16, wherein the second power supply is located externally to the table top network switch.

18. The table top network switch of claim 16, wherein the table top network switch is configured to auto detect the information from the second power supply.

19. The table top network switch of claim 18, wherein the information comprises at least one of a group consisting of:
voltage requirements for the plurality of powered devices;
current requirements for the plurality of powered devices;
a maximum output power of the second power supply; and
an identity of the second power supply.

20. The table top network switch of claim 18, wherein the table top network switch is configured to query the second power supply for the information upon its coupling to the table top network switch.

21. The table top network switch of claim 20, wherein the second power supply is configured to provide the information in response to the query.

22. The table top network switch of claim 18, wherein the table top network switch is coupled to the second power supply via a power conductor, the table top network switch being configured to query the second power supply over the power conductor.

23. The enterprise network environment of claim 11, wherein the table top network switch is configured to provide a first data communication and a second data communication to the first group of powered devices and the second group of powered devices, respectively.

24. A table top network switch for a Power-over-Ethernet (PoE) system, comprising:
a first power supply configured to provide a first direct current (DC) power; and
a network switch coupled to the first power supply, wherein the network switch is configured to:
receive information from a second power supply response to detecting a connection between the second power supply and the network switch, the second power supply being configured to provide a second DC power,
provide the first DC power and the second DC power, respectively, to a first group of powered devices and a second group of powered devices from among a plurality of powered devices, and
provide the second DC power for data communications for a second group of powered non-PoE powered devices.

25. The table top network switch of claim 24, wherein the network switch is further configured to:
provide the first DC power for data communications for a first group of non-PoE powered devices.

* * * * *

UNITED STATES PATENT AND TRADEMARK OFFICE
CERTIFICATE OF CORRECTION

PATENT NO. : 8,397,093 B2  Page 1 of 1
APPLICATION NO. : 13/007084
DATED : March 12, 2013
INVENTOR(S) : Diab et al.

It is certified that error appears in the above-identified patent and that said Letters Patent is hereby corrected as shown below:

In the Claims

At Column 14, Line 33, Claim 10, please replace "fin,iler" with --further--.

At Column 16, Line 20, Claim 24, please replace "powered non-PoE" with --non-PoE--.

Signed and Sealed this
Twenty-sixth Day of November, 2013

Margaret A. Focarino
*Commissioner for Patents of the United States Patent and Trademark Office*